Figures 1, 2:
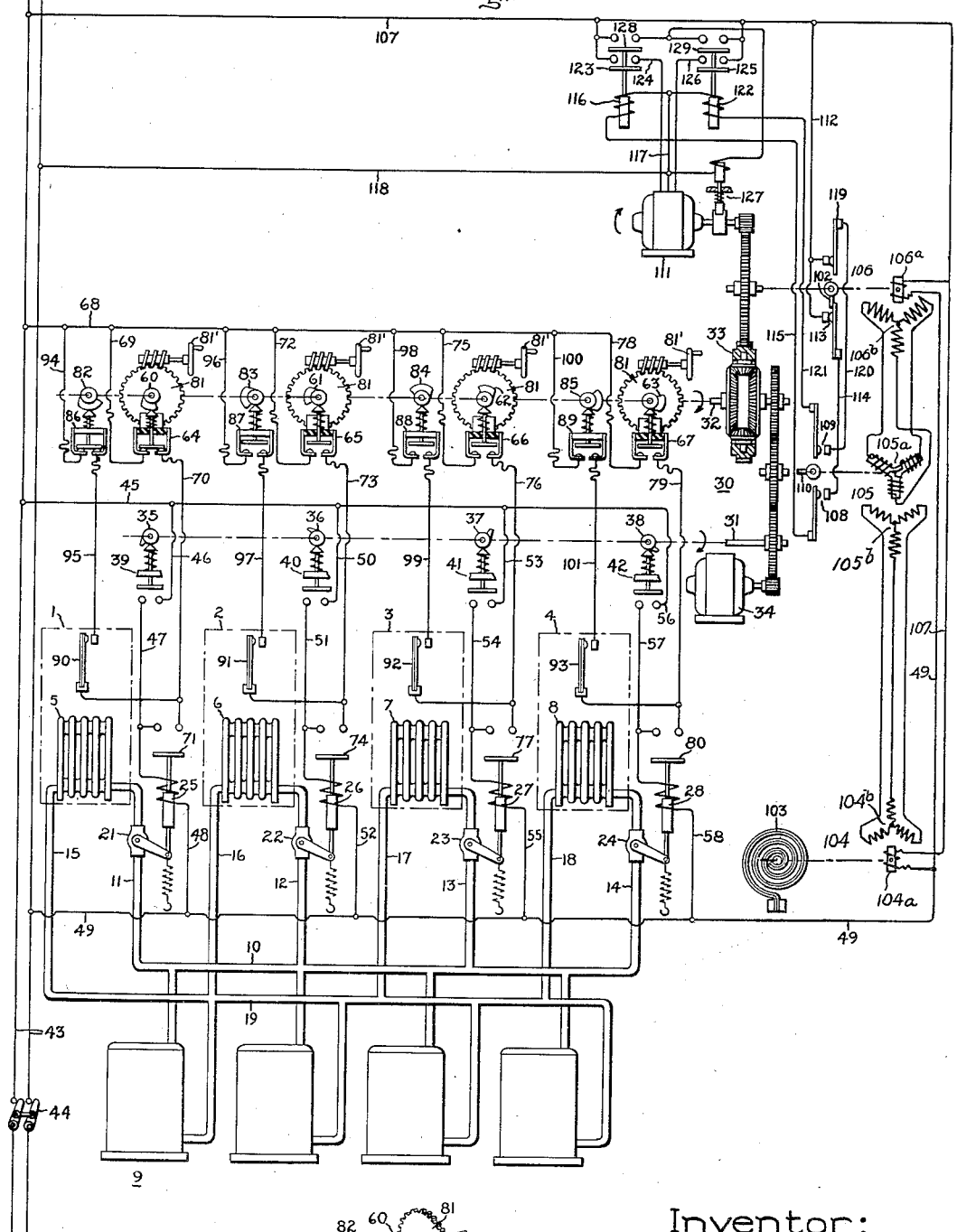

May 9, 1939.     H. R. CRAGO     2,157,817

ZONE HEATING SYSTEM

Filed Nov. 14, 1936

Inventor:
Harry R. Crago,
by Harry E. Dunham
His Attorney.

Patented May 9, 1939

2,157,817

UNITED STATES PATENT OFFICE 2,157,817

ZONE HEATING SYSTEM

Harry R. Crago, Caldwell, N. J., assignor to General Electric Company, a corporation of New York Application November 14, 1936, Serial No. 110,871

22 Claims. (Cl. 236—91)

My invention relates to zone heating systems and particularly to improvements in the thermal control of such systems.

It is an object of my invention to provide an improved heat transfer system of the type wherein a zone or a plurality of zones to be conditioned are supplied with a heat transfer medium periodically and in which the length of time during which the heat transfer medium is supplied may be varied gradually in accordance with changes in outdoor temperature.

A further object of my invention is to provide such a system with a control providing a very close regulation over the period of supply in response to variations in outdoor temperature and one which may be economically and compactly built.

The present invention is an improvement over the system forming the subject matter of my application for Letters Patent, Serial No. 44,250, filed October 9, 1935, assigned to the assignee of the present application. This application covers an arrangement comprising independent control circuits for regulating means controlling the admission of heating medium to each zone and means energized independently of the aforesaid control circuits and selectively operable in response to variations in outdoor temperature for selecting predetermined control circuits and distributing the medium to the zones periodically and sequentially whereby the system is maintained under positive control of an outdoor thermostat at all times.

A primary object of my present invention is to provide an arrangement whereby the length of time that the heating medium is supplied to the zones is gradually varied in response to variations in outdoor temperature.

A further object of my invention is to provide an arrangement whereby a heating medium is supplied to a zone for a length of time in excess of the normal length of time when the zone temperature is below a predetermined minimum value.

A still further object of my invention is to provide a control whereby the length of the supply period of each of the zones individually may be varied independently of the control exerted by the zone thermostat and outdoor thermostat in order that the supply may be selectively varied to meet different conditions obtaining in the various installations. More particularly, it is an object of my invention to provide a means enabling the aforementioned independent control to be exerted during the normal operation of the system.

A more detailed understanding of the present invention may be secured from the following description taken in connection with the accompanying drawing in which is illustrated a preferred embodiment of the invention.

Fig. 1 of the drawing shows a schematic diagram of a heating system and control embodying the invention and Fig. 2 illustrates in perspective a detail of the control shown in Fig. 1.

Referring to Fig. 1 of the drawing, reference numerals 1 to 4, inclusive, illustrate a plurality of independent zones to be conditioned and although only four are illustrated in the figure my invention is applicable to a system comprising any number of zones. These zones are illustrated as being distinct and separate from each other as might be a plurality of separate buildings. However, my invention may be applied equally well to a number of rooms with one room or a number of rooms considered as constituting a single zone.

Each of the zones is provided with a heat exchanger as indicated by reference numerals 5 to 8, inclusive. It should be understood that by the term heat exchanger I mean either a single device such as a radiator illustrated in the figure or a number of such devices. Inasmuch as it is conceivable that the zones could be cooled as well as heated, it is to be understood that I do not intend to be limited to a heating system, which is illustrated only for the purpose of describing the invention. I intend that my invention be applied to cooling systems as well.

The zones are provided with a condition changing medium such as steam from a central source 9 illustrated as consisting of a plurality of boilers of any desired type, although a single boiler could be utilized just as well. However, as previously stated, the source might equally well be a source of cooled air or other medium to furnish refrigeration. The steam flows to the various zones through a common header 10 and individual risers 11 to 14 leading to zones 1 to 4, inclusive, respectively. In a closed system of the type indicated the condensed steam is returned by means of individual risers 15 to 18, inclusive, to a common return header 19 connected to each of the boilers. The flow of steam to each zone is controlled by regulating means such as valves 21 to 24, inclusive, which are biased to their closed positions by means of springs. Each valve is adapted to be actuated into its open position by means of electro-magnetic motive means such as the valve operating solenoids 25 to 28, inclusive. The solenoid plunger or armature of each solenoid is attached to the valve so that when the relay winding is energized the armature is moved against the bias of the spring to open the valve. It is obvious that one skilled in the art might interpose a number of valves in each supply riser to be controlled by a single solenoid in case a separate control valve for each of a number of heat exchangers in a zone are to be used or a plurality of solenoids adapted to be energized simultaneously in case it is desired to provide each of the heat exchangers with a separate solenoid operated valve and that a different type of actuating device for the valve might also be used, as, for instance, an electric motor or compressed air.

In order that the valves may be opened to distribute the steam to the zones periodically and sequentially for a variable length of time in response to variations in outdoor temperature I have provided control means indicated generally by reference numeral 30. The control means consists, briefly, of a first cam carrying shaft 31 adapted to close energizing circuits for the various solenoid valves and a second cam carrying shaft 32 driven through a planetary differential gear mechanism for maintaining the solenoids energized for a predetermined length of time and thereafter deenergizing the same. The arrangement is such that under normal conditions, i. e., when the outdoor temperature is constant, shafts 31 and 32 are driven at a constant speed and have a fixed angular relationship to each other whereby solenoid valves are energized for a predetermined length of time. Upon a variation in outdoor temperature the angular relationship of shaft 32 with respect to shaft 31 is varied in response to the variations to thereby vary the length of time during which the various solenoids are energized.

The details of the mechanism whereby the above described control is obtained will now be described. Shaft 31 is driven at a constant speed by suitable motive means such as electrical motor 34 continuously energized with its shaft 31 rotating in the direction indicated by the arrow. The shaft mounts a plurality of cams 35 to 38, inclusive, adapted respectively to energize solenoids 25 to 28, sequentially by closing in sequence a plurality of spring biased contact mechanisms 39 to 42, inclusive, thereby connecting the solenoids to a suitable source of single phase alternating current power 43 whenever a manually operable switch 44 placed in the power circuit is closed. The energizing circuit for solenoid 25 controlling the flow of steam to zone 1 extends from the source of power through conductors 45 and 46, switch mechanism 39, and conductor 47 to the winding of the solenoid and thence through conductors 48 and 49 back to the other supply conductor 49. In similar manner solenoid 26 is connected to the common conductors 45 and 49 leading to the source through conductors 50, 51 and 52 and solenoids 27 and 28 by conductors 53, 54, and 55 and 56, 57, and 58, respectively.

The second cam carrying shaft 32 is rotated in the same direction as shaft 31, as indicated by the arrow, through suitable gearing and the planetary differential drive 33. Shaft 32 likewise mounts a plurality of cams 60 to 63, inclusive, adapted to cooperate with the cams 35 to 38, respectively to maintain the various solenoids energized for a predetermined length of time. The last mentioned cams are so arranged with respect to the cams carried by cam shaft 31 that they close a holding circuit to each solenoid either simultaneously with the closing of the energizing circuit by cams carried by shaft 31 or some predetermined time thereafter depending upon the construction of the cams and the angular relationship between shafts 31 and 32. Associated respectively with cams 60 to 63 are spring biased contact mechanisms 64 to 67, inclusive, adapted when actuated by the cam to close a holding circuit from a common conductor 68 to the various solenoids. The holding circuit for solenoid 25 extends from conductor 68 to conductor 47 through conductor 69, switch mechanism 64, conductor 70, and a switch 71 comprising a pair of normally open contacts adapted to be closed by a bridging member whenever solenoid 25 is energized. The holding circuit to solenoid 26 is similar in all respects to that just described and it extends through conductor 72, switch 65, conductor 73 and the normally open switch 74. The holding circuits to solenoids 27 and 28 extend through conductors 75, 76 and switch 77 and conductors 78, 79 and switch 80, respectively.

Each of the contact mechanisms 64 and 67, inclusive, associated with the cams carried by shaft 32 is mounted on a rotatably mounted gear 81 journaled separately from the shaft 32, and provided with a hand wheel 81' whereby the position of the contact mechanism with respect to the cam may be varied as desired, as indicated more clearly in Fig. 2. The purpose of this arrangement is to provide means whereby the duration of the period of supply of medium may be varied as desired by varying the length of time that the various cams carried by shaft 32 maintain the solenoids energized through their respective holding circuits.

In order to provide means for supplying each zone with an added amount of heat in case the temperature within any zone decreases below a predetermined minimum value, I have provided means for maintaining the solenoid energized through its holding circuit a fixed length of time in addition to that provided by the normal holding contact. This means consists of a plurality of cams 82 to 85, inclusive, each bearing a fixed angular relationship to cams 60 to 63, inclusive, and adapted to cooperate with spring biased contact mechanisms 86 to 89 inclusive (similar in all respects to contact mechanisms 64 to 67 and likewise mounted for rotation on gear wheels 81), and thermal responsive means 90 to 93 inclusive, in the various zones to maintain the solenoids energized for a fixed length of time in excess of the time as determined by cams 60 to 63. Cams 82 to 85, inclusive, are capable of maintaining the solenoids energized for a greater length of time than cams 60 to 63 inclusive, because of the increased length of their operating portions. The circuit for zone 1 extends from conductor 68 through conductor 94, contact mechanism 86, conductor 95 and thermostat 90 to conductor 70. The circuit for zone 2 extends through conductor 96, switch mechanism 87, conductor 97, and thermostat 91 to conductor 73. The circuits for zones 3 and 4 extend from conductors 98, 99 and thermostat 92 and conductors 100, 101 and thermostat 93, respectively, to conductors 76 and 79 respectively.

The mechanism for varying the angular positions of the two contact carrying shafts includes a thermal responsive means 103 responsive to variations in outdoor temperature and an electrical motion transmitting device 104 of a known type actuated thereby. The latter is associated with the electrical differential motion receiving device 105, also of a known type, and a second electrical motion transmitting device 106 similar in all respects to device 104 connected to gearing associated with the planetary drive.

Motion transmitting device 104 is actuated in response to outdoor temperature changes and it in turn transmits variations in its position to the differential receiving device 105. The latter, upon a predetermined change in its position will close contacts energizing a motor adapted to vary the angular relation between the cam shafts. As the motor rotates it actuates, through suitable mechanical connections, the second motion transmitting device 106 which in turn transmits variations in its position to the differential device. When the two transmitting devices have turned the same amount the receiving device is returned to its normal or neutral position. Associated with device 106 are a pair of limit switches to limit the angular distance that the cam shafts may be rotated with respect to each other, as will be pointed out more fully hereinafter.

The motion transmitting device 104 is mechanically a miniature bipolar three-phase alternator. Its rotor 104a is provided with a single phase concentrated winding (not shown) and its stator member 104b is provided with a three-circuit, distributed, Y-connected winding (not shown). The rotor winding is connected to a source of single phase voltage 43 through conductors 49 and 107. Electrically, in normal operation the transmitter acts as a transformer and voltages and current existing in the device are of single phase. By transformer action voltages are induced in the three elements of the stator winding and the magnitude of these voltages depend upon the angular position of the rotor.

The transmitting device 106 is in all respects identical with the transmitting device 104, its rotor winding being supplied from the source of supply through conductors 49 and 107.

The electrical differential motion receiving device 105 is similar in construction to the transmitting device except that its rotor has a distributed, three-circut, Y-connected winding. Thus, its physical form is that of a miniature, three-phase, wound rotor, induction motor. However, in normal operation, its function is that of a single phase transformer and three-phase voltages and current do not exist.

The stator winding of the differential device is connected phase for phase to the stator winding of the transmitter 104, and the rotor winding is connected phase for phase to the stator winding of the transmitting device 106. Since the differential device does not have a connection directly to the source of supply, its exciting current must be furnished through one or both of the transmitting devices to which it is connected.

In operation, the differential device is very similar to that of an ordinary electrical motion receiving device. The voltage distribution in its stator winding is the same as in the stator winding of the transmitting device 104, and, therefore, the distribution of the flux in the stator winding is the same as in that of the transmitting device 104. Likewise, the impressed voltage distribution in its rotor winding is the same as in that of the stator winding of the transmitting device 106 to which it is connected. The induced rotor winding voltage distribution is, of course, determined by the distribution of the exciting flux. The point of equilibrium is such that the direction and magnitude induced voltages in the rotor winding of the differential device are equal and opposite. Under this condition, there is a minimum current flow. Disturbance of this condition will set up a circulating current, which will react on the excitation flux, producing a torque tending to restore the equilibrium condition. A disturbance can be set up by moving the rotor of any one of the three devices 104, 105 and 106. If the rotor member of any one of the three is fixed in position and the rotor member of the second one is displaced a certain angle, the rotor of the third, being free to rotate, will turn to the same angle. If the rotors of any two of the devices are rotated simultaneously the rotor of the third device will rotate through an angle equal to the algebraic sum of the movement of the other two, the algebraic sign being dependent not only upon the physical direction of rotation of the rotors, but also upon the phase rotation of the windings. The connection of the stator and rotor windings of the differential device 105 with the stator windings of the transmitting devices 104 and 106 are so made that the rotation of the rotor of the differential device 105 is equal to the difference of the rotation of rotors of the two transmitting devices 104 and 106.

Associated with the differential device are a pair of contacts 108 and 109 adapted to be closed by an arm 110 connected to the rotor member of the differential device through suitable gearing (not shown) upon a predetermined movement of the rotor. These contact devices are adapted to energize the opposite windings of a reversible electric motor 111 in response to fluctuations in outdoor temperature and to thereby drive the planetary gears of the planetary differential drive. Switch 108 is adapted to close a circuit leading from conductor 107, conductor 112, limit switch 113 (whose purpose will be explained later), conductor 114, and conductor 115 leading to a relay 116 and thence through conductors 117 and 118 back to the source of supply. Switch 109 is adapted to close a similar energizing circuit leading from one side of the source of power through conductors 107, and 112, limit switch 119, conductors 120, and 121 leading to the relay 122 and thence through conductors 117 and 118 back to the other side of the source of power. Relay 116 is adapted to energize that winding of the reversible motor 111 which effects rotation thereof in the direction of the arrow whereas relay 122 energizes that winding of the motor which effects rotation thereof in the opposite direction. The motor energizing circuit closed by relay 116 extends from conductor 107 through switch 123 and conductor 124 to the motor and thence to the source of supply through conductor 118. The energizing circuit closed by relay 122 extends through conductor 107, switch 125 and conductor 126 to the motor and thence through conductor 118 to the source of supply.

Motor 111 is normally held stationary by an electro-magnetically actuated brake mechanism 127 which is adapted to be released by energization of the relay associated therewith, whenever either of relays 116 or 122 are energized, by connection of the brake relay to the source of supply by switches 128 and 129, respectively.

With the above understanding of the apparatus and connections and the organization in the completed system, the operation of the system itself will be readily understood from the following detailed description.

In the ensuing description it will be assumed that the respective zone thermostats are adapted to close their associated circuits at a temperature of 70° and it may be noted that in the illustrated position of the cams, steam is supplied to the various zones for the maximum length of time because of the fact that the cams on shafts 31 and 32 close their respective circuits not only simultaneously, but cams on shaft 32 maintain the circuits closed for the full length of the working surface. In other words, the cams are effective to maintain the respective valves open for the total length of time that the cam closes its contacts. These are the conditions obtaining when the outdoor temperature is at a very low value and which value may be somewhere near the lowest temperature occurring during the normal heating season.

Assuming that the outdoor temperature remains at some constant value and that manually operable switch 44 is closed connecting the control with a suitable source of single phase A. C. energy and that the cam system driving motor 34 is energized, then shafts 31 and 32 will be rotated at the same speed through the gear train and the planetary differential drive mechanism 33. With shafts 31 and 32 rotating in the direction indicated by the arrows then cam 38 will effect periodically movement of its associated contact mechanism 42 to close the normally open contacts associated therewith and thereby close an energizing circuit for the solenoid 28 controlling the valve 24 regulating the flow of steam to zone 4. The energizing circuit for this solenoid extends from one of supply conductors 43 through conductors 45 and 56, switch mechanism 42, conductor 57 to the solenoid winding and thence back to the other supply conductor through conductors 58 and 49. Energization of the solenoid effects opening of the valve 24 against the bias of the spring and also effects closure of switch 80. Closure of this switch results in the continued energization of solenoid 28 through a holding circuit including conductor 66, switch mechanism 67, which was moved into circuit closing position by cam 63 simultaneously with the closure of contact mechanism 42 by cam 38, and conductor 79. Very shortly after the above described operation, cam 38 allows the switch mechanism 42 to return to the position indicated without affecting in any way the operation of the solenoid. After a predetermined time interval as determined by the construction of cam 63 the latter permits the opening of its associated switch mechanism and the subsequent deenergization of solenoid 28 whereupon valve 24 is closed by its associated spring.

From the detailed description given above it will be obvious that the operation for the remaining regulating valves of the system will be exactly the same as that described in connection with zone 4. Cam 37 effects closure of an energizing circuit for solenoid 27 immediately upon deenergization of solenoid 28 and the solenoid is energized for predetermined length of time by cam 62. In similar manner cams 36 and 35 close energizing circuits for solenoids 26 and 25, respectively, and cams 61 and 60 maintain the solenoids energized for predetermined lengths of time.

The cam arrangement illustrated is so arranged that steam is admitted to the zones periodically and sequentially. It will be obvious to those skilled in the art that this arrangement need not be adhered to strictly for the various cams may be so positioned on their shafts that the operation is periodic only and not sequential. According to this arrangement all of the cams would occupy the same relative positions on each shaft.

In many installations the heat losses from a particular zone are not exactly the same as those from another zone. Thus, with predetermined conditions obtaining outdoors such, for instance, as that assumed where the outdoor temperature is quite low it may be that zone 4, for instance, does not require steam to be supplied thereto for the maximum length of time. This may result from the fact that some of the heat from the other zones finds its way to zone 4, that it may be better insulated against heat losses, or because of a change in the wind direction, solar radiation and the like. For this reason, provision should be made for changing the amount of heat supplied thereto which would not interfere with the normal operation of the remainder of the system. To achieve this operation, I have provided, as brought out previously, the manually operable means 81—81' for varying the position of the contact mechanisms associated with shaft 32 with respect to the cam. In the illustrated position, cam 63 is effective to maintain its associated solenoid energized for a maximum length of time. To decrease this length of time it is only necessary to rotate hand wheel 81' in a direction to effect rotation of the gear 81 in a counter-clockwise direction, i. e., in a direction opposite to the arrow indicating rotation of shaft 32 to effect movement of the contact mechanism 67 in a counter-clockwise direction and thereby decrease the length of time that steam is admitted to zone 4. This results from the fact that cam 63 closes its associated contact mechanism sometime prior to the time that cam 38 closes its associated contact mechanism, thereby decreasing the effective length of the circuit closing portion of the cam. It should be noted in particular that all this may be accomplished while shaft 32 is rotating.

Assuming that the outdoor temperature decreases below a certain minimum value and that the differential motion transmitting apparatus has operated to its extreme position at which limit switch 113 is opened by the switch operating arm 102 of the motion transmitting device 106, thereby preventing energization of motor 111 by the differential receiving device 105 then, when the temperature in any particular zone falls below 70° the zone thermostat maintains the holding circuit of the valve operating solenoid for a greater length of time. Assuming that the temperature in zone 4 decreases below 70°, then thermostat 93 engages its associated contact to close a contact across conductors 79 and 101. During the continued rotation of shaft 32 cam 85 effects closure of its associated contact mechanism 89 and solenoid 28 will be energized for a length of time determined by the construction of cam 85. This cam is illustrated as capable of maintaining its associated contact closed for a length of time in excess of that of which cam 63 is capable of maintaining contact mechanism 67 closed. Therefore, under these conditions solenoid valve 28 is energized through its holding circuit to maintain the valve 24 open for a length of time which is a fixed amount in excess of the normal length of time. It is obvious that cam 85 may be constructed to give an adequate supply of heat under the most severe conditions occurring in any particular locality.

Considering now the operation of my system when the outdoor temperature changes, it will be remembered that it has been assumed that the outdoor temperature is quite low. In the previous paragraph, it was pointed out that under these conditions the switch operating arm 102 will effect opening of limit switch 113 thereby preventing energization of the motor 111 in a direction to further increase the length of time during which steam may be supplied to the respective zones. The reason for this is, of course, that rotation of shaft 32 to increase further the angular displacement therebetween and shaft 31 would not only throw the system out of operation because the shaft 32 is illustrated in the position wherein the cams thereon maintain their associated circuits closed for the greatest length of time.

Upon an increase in outdoor temperature thermostat 103 will effect rotation of the motion transmitting device 104 and the latter will effect in turn rotation of the differential motion receiving device 105 because motion transmitting device 106 is held stationary by the brake mechanism 127. The motion transmitting device 104 and the receiving device 105 are so arranged that the latter will close switch 109 upon an increase in temperature of a predetermined amount, which amount may be varied by suitable gearing (not shown) in order that the device be made as sensitive as desired. Upon closure of switch 109 motor 111 is energized and brake 127 released and the angular position of shaft 32 with respect to shaft 31 is changed, i. e., the angular displacement between the two is decreased upon an increase in temperature. Energization of motor 111 is effected by the energization of relay 122, the energizing circuit for which extends from the power source through conductors 107 and 112, limit switch 119 in its closed position, conductor 120, switch 109 in its closed position and conductor 121 leading to the relay winding and thence through conductors 117 and 118 to the other side of the source of power. Energization of relay 122 energizes that winding of the motor which effects rotation of motor 111 in a counter-clockwise direction looking at the motor from the pinion end, (i. e., in a direction opposite to the arrow). The energizing circuit extends from the power supply through conductor 107, switch 125 and conductor 126 to the motor winding and from thence through conductors 117 and 118 back to the other side of the source of power. Simultaneously, the brake mechanism is released by energization of the winding associated therewith, the energizing circuit extending from the source of power through conductor 107, and switch 129 to the relay winding and from thence through conductor 118 to the other source of power. Upon energization motor 111 rotates in the above described direction and effects rotation of shaft 32 at an increased speed through the planetary differential drive 33 in a direction such as will decrease the angular displacement therebetween and shaft 31. The motor 111 is energized for a predetermined length of time and effects rotation of motion transmitting device 106 through suitable gearing (not illustrated). Predetermined rotation of this device effects a change in the phase relation and magnitudes of currents in the rotor of the differential device 105 and the arrangement is such that upon a predetermined rotation it will balance the effect imparted to the differential device by device 104 and return the contact operating arm 110 to its neutral position and thus effect deenergization of motor 111 by the opening of contacts 109.

Upon a further increase in outdoor temperature the above described operation is repeated and motor 111 energized to further decrease the angular displacement between the two shafts. This operation continues with increasing temperatures until such time as the outdoor temperature reaches some predetermined maximum value at which time the angular displacement between the two shafts has been reduced to a minimum value so that no steam is admitted to the various zones. When the shafts have been rotated into this angular relationship, limit switch operating arm 102 will have been rotated to its opposite extreme to open limit switch 119 and the cams will be rotated without affecting energization of the various valve operating solenoids.

Assuming now that the outdoor temperature begins to decrease, then the outdoor thermostat 103 will effect rotation of the motion transmitting device in an opposite direction from that heretofore described and the latter in turn will effect rotation of the differential motion receiving device in a direction to close switch 108. Closure of the latter effects energization of motor 111 through energization of relay 116. The energizing circuit for the relay extends from the source of power through conductors 107 and 112, limit switch 113, conductor 114, limit switch 108 and conductor 115 to the relay winding and thence to the source of power through conductors 117 and 118. The energizing circuit for the motor winding extends from the source of power through conductor 107, switch 123 in its closed position and conductor 124 to the motor winding and from thence through conductors 117 and 118 back to the source of power. Simultaneously with the energization of the motor the brake is released by closure of switch 128 connecting the brake winding to the source of power through a previously described circuit. Motor 111 is thereupon rotated in a clockwise direction looking at the motor from its pinion end (i. e., in the direction of the arrow). Shaft 32 is thereby rotated at a decreased speed and the angular displacement therebetween and shaft 31 is thereby increased. Steam is now admitted to the various zones for a minimum length of time and after a predetermined rotation of motor 111 the motion transmitting device 106 will again balance the effect of motion transmitting device 104 and the differential receiving device assumes its neutral or normal position and effects opening of switch 108 and deenergization of motor 111. Upon further decrease in outdoor temperature, the above described operation is repeated and the length of time during which steam is supplied to the various rooms is increased until such time as the outdoor temperature decreases to a predetermined minimum value.

It will be obvious to those skilled in the art that the variation in outdoor temperature required to effect energization of the motor 111 may be varied at will by varying the various gear ratios between motion transmitting and receiving devices and the mechanisms actuating or actuated thereby. By varying the gear ratio the device may be made as sensitive as desired to changes in outdoor temperature.

Furthermore, it may be seen that my system is not limited to an arrangement including four zones but may be utilized in an arrangement comprising as many zones as desired. The only changes necessary to vary the number of zones is the addition or subtraction of cams on the two shafts 31 and 32.

What I claim as new and desire to secure by Letters Patent of the United States is:

1. In a heat transfer medium supply system, the combination including regulating means for controlling the supply of heat transfer medium, timing means for controlling said regulating means to supply said medium periodically for variable lengths of time, said timing means having a pair of relatively adjustable timing elements, one for periodically rendering said regulating means effective to supply said medium and the other for periodically rendering said regulating means effective to terminate the supply of said medium and means including a thermal responsive device for effecting relative adjustment of said timing elements during operation of said timing means to vary the time between the initiation and termination of the supply of said medium in response to temperature variations.

2. In a heat transfer medium supply system for a plurality of zones, the combination including separate regulating means for controlling the supply of heat transfer medium to each of said zones, means for controlling said separate regulating means to distribute said medium to said zones periodically and sequentially, said control means including a pair of relatively variable timing means one periodically rendering said separate regulating means effective sequentially to supply said medium to the respective zones, and the other periodically rendering said separate regulating means effective sequentially to terminate the supply of said medium to the respective zones, and means for varying the relative time of operation of said timing means.

3. In a heat transfer system, the combination including a source of heat transfer medium, a plurality of zones to be supplied therewith, separate regulating means for controlling the flow of said medium to each of said zones, means for controlling said separate regulating means to distribute said medium to said zones periodically and sequentially, said means including a first timing means operatively connected with each of said separate regulating means and acting periodically to render said regulating means effective sequentially to supply said medium to the respective zones, and second timing means operatively connected with each of said regulating means and acting periodically after the action of said first timing means to render said separate regulating means effective sequentially to terminate the supply of said medium to said zones, and means including a thermal responsive device for varying the time between the actions of said first and second timing means in response to variations in a predetermined temperature.

4. In a heat transfer system, the combination including a source of heat transfer medium, a plurality of zones to be supplied therewith, regulating means for controlling the supply of said medium to each of said zones, means for controlling said regulating means to distribute said medium to said zones periodically and sequentially, said control means including a first timing means periodically rendering said regulating means effective sequentially to supply said medium to the respective zones and second timing means periodically rendering said regulating means effective sequentially to terminate the supply of said medium a predetermined time after the action of said first timing means, means including a thermal responsive device for regulating one of said timing means to vary said predetermined time in response to variations in a predetermined temperature, and means for regulating one of said timing means to vary said predetermined time independently of said thermal responsive device.

5. In a heat transfer medium supply system, the combination including electrically operated regulating means for controlling the supply of heat transfer medium to a zone and operable upon energization thereof to supply the medium and upon deenergization thereof to terminate the supply of the medium, means for controlling the energization of said regulating means to supply said medium to said zone periodically for variable lengths of time, said means including a first timing switch acting periodically to energize said regulating means and a second timing switch acting periodically a predetermined time after the action of said first timing switch mechanism to deenergize said regulating means, and means including a thermal responsive device for regulating one of said timing switches to vary said predetermined time in response to variations in a predetermined temperature.

6. In a heat transfer medium supply system, the combination including electrically operated regulating means for controlling the supply of heat transfer medium to a zone and having an energizing circuit and a holding circuit, means for controlling said regulating means to supply said medium to said zone periodically for variable lengths of time, said means including a first timing switch adapted periodically to close the energizing circuit of said regulating means, a switch operated by said regulating means upon the initial energization thereof for closing said holding circuit, and a second timing switch acting periodically a predetermined time after the action of said first timing switch to open said holding circuit, and means including a thermal responsive device for regulating one of said timing switches to vary said predetermined time in response to variations in a predetermined temperature.

7. In a heat transfer medium supply system for a plurality of zones, the combination including separate regulating means for controlling the supply of medium to each of said zones, and timing control means having a pair of relatively adjustable rotating cam mechanisms with a differential drive connection therebetween for controlling said separate regulating means to supply said medium to said zones periodically and sequentially for a variable length of time, and having a thermal responsive element operable proportionally to variations in a predetermined temperature and provided with means for controlling said differential drive connections to vary said length of time correspondingly.

8. In a heat transfer medium supply system for a plurality of zones, the combination including separate regulating means for controlling the supply of medium to each of said zones, and timing control means having a pair of relatively adjustable rotating cam mechanisms with a differential drive connection therebetween for controlling said separate regulating means to supply said medium to said zones periodically and sequentially for a variable length of time, and having independent cam adjustable means for separately adjusting the length of time for supplying medium to each of said zones, and thermal responsive means for controlling said differential drive connection to jointly varying the lengths of time for supplying medium to all said zones.

9. In a heat transfer medium supply system for a plurality of zones, the combination including separate regulating means for controlling the supply of medium to each of said zones, and timing control means for controlling said separate regulating means to supply said medium to said zones periodically and sequentially for a variable length of time, and having adjustable means for separately adjusting the length of time for supplying medium to each of said zones, and a plurality of thermal responsive means, one for jointly varying the lengths of time for supplying medium to all said zones in accordance with outdoor temperatures, and each of the others for separately varying the length of time for supplying medium to a corresponding zone in accordance with the temperature of said zone.

10. In a heat transfer medium supply system for a plurality of zones, the combination including separate regulating means for controlling the supply of medium to each of said zones, timing control means for controlling said separate regulating means to supply said medium to said zones periodically and sequentially for a variable length of time, and having a plurality of thermal responsive means, one for jointly varying the lengths of time for supplying medium to all said zones in accordance with outdoor temperatures, and each of the others for separately varying the length of time for supplying medium to a corresponding zone in accordance with the temperature of said zone.

11. In a heat transfer system, a source of heat transfer medium, a plurality of zones to be supplied therewith, regulating means for controlling the flow of said medium to each of said zones, means for controlling said regulating means to distribute said medium to each of said zones periodically and sequentially for predetermined lengths of time, means responsive to outdoor temperature variations for varying said predetermined length of time from a predetermined minimum value to a predetermined maximum value, and means responsive to the temperature in one said zones controlling said regulating means for distributing said medium to said one zone for a predetermined length of time in excess of said predetermined maximum time when the temperature in said zone decreases below a predetermined minimum value.

12. In a heat transfer system, the combination including a source of heat transfer medium, a plurality of zones to be supplied therewith, regulating means for controlling the supply of said medium to each of said zones, means for controlling said regulating means to distribute said medium to each of said zones periodically and sequentially, said means including a first means adapted periodically to render each of said regulating means effective sequentially to initiate transfer of said medium to each of said zones and second means acting a predetermined time after said first mentioned means to render said regulating means effective to terminate transfer of said medium, means including a thermal responsive device for varying said predetermined time in response to variations in outdoor temperature, manually operable means for varying said predetermined time independently of said thermal responsive device, and means including a thermal responsive device for varying said predetermined time independently of said first mentioned thermal responsive device and manually operable means in response to predetermined variations in temperature within said zones.

13. In a heat transfer system, a source of heat transfer medium, a plurality of zones to be supplied therewith, electrical regulating means for controlling the supply of said medium to each of said zones, means for controlling said regulating means to distribute said medium to each of said zones periodically and sequentially, said means including a source of electrical energy, a constant speed mechanism for periodically and sequentially connecting said regulating means to said source of energy to initiate the supply and a variable speed mechanism periodically and sequentially disconnecting said regulating means from said source of energy to terminate the supply, and means including thermal responsive means for intermittently varying the speed of said variable speed mechanism in response to variations in outdoor temperature.

14. In a heat transfer system, a source of heat transfer medium, a plurality of zones to be supplied therewith, electrical regulating means for controlling the flow of said medium to each of said zones, means for controlling said regulating means to distribute said medium to each of said zones periodically and sequentially, said means including a source of electrical energy, a constant speed mechanism for periodically and sequentially connecting said regulating means to said source of energy and a second speed mechanism normally driven at a constant speed for periodically and sequentially disconnecting said regulating means from said source of energy after a predetermined length of time, and means responsive to variations in outdoor temperature adapted to vary the speed of said last mentioned mechanism for a length of time determined by the change in outdoor temperature for varying said predetermined length of time.

15. In a heat transfer system, the combination including a source of heat transfer medium, a zone to be supplied therewith, regulating means for controlling the supply of said medium to said zone, means controlling said regulating means for distributing said medium to said zone periodically for predetermined lengths of time, said means including a first rotatable control mechanism operable at predetermined time intervals for initiating the supply and a second rotatable control mechanism having a variable angular relationship to said first mechanism for terminating supply, and means responsive to variations in outdoor temperature for varying the angular relationship between said rotatable control mechanisms.

16. In a heat transfer system, a source of heat transfer medium, a plurality of zones to be supplied therewith, electrical regulating means for controlling the flow of said medium to each of said zones, means for controlling said regulating means to distribute said medium to each of said zones periodically and sequentially, said means including a source of electricity, cam carrying shaft and circuits closable thereby for periodically and sequentially connecting said regulating means to said source of energy, and a second cam carrying shaft for periodically and sequentially disconnecting said regulating means from said source a predetermined length of time thereafter, and means including thermal responsive means adapted to vary the angular relationship between said shafts for varying said predetermined length of time.

17. In a temperature regulating system, the combination including a plurality of electric control devices, a source of energy therefor, a cam mechanism mounted on a shaft rotated at a predetermined constant speed for momentarily connecting said control devices to said source periodically, a second cam mechanism mounted on a second shaft normally rotated at said predetermined speed and having a fixed angular relation to said first shaft for maintaining the connection of said devices to said source for a predetermined length of time, and means for varying the speed of said second mentioned shaft and thereby the angular relation between said shafts for varying said predetermined length of time.

18. In a temperature regulating system, the combination including a plurality of electric control devices, a source of energy therefor, a cam mechanism mounted on a shaft rotated at a predetermined constant speed for momentarily connecting said control devices to said source periodically, a second cam mechanism mounted on a second shaft normally rotated at said predetermined speed and having a fixed angular relation to said first shaft for connecting said devices to said source for a predetermined length of time, means for varying the speed of said second mentioned shaft and thereby the angular relation between said shafts for varying said predetermined length of time, third cam mechanism mounted on said second mentioned shaft bearing a fixed angular relation to said second cam mechanism, and circuits including thermal responsive means closable by said third cam mechanism for connecting said control devices to said source of energy independently of said two first mentioned cam mechanisms.

19. In a heat transfer system, the combination including a source of heat transfer medium, a zone to be supplied therewith, regulating means for controlling the supply of said medium to said zone, means controlling said regulating means for distributing said medium to said zone periodically for predetermined lengths of time, said means including a first rotatable control mechanism operable at predetermined time intervals for initiating the supply and a second rotatable control mechanism having a variable angular relationship to said first mechanism for terminating the supply, and means responsive to variations in outdoor temperature for varying the angular relationship between said rotatable mechanisms, said last mentioned means including condition responsive means, an electrical motion transmitting device actuated thereby, an electrical motion receiving device actuated by said transmitting device, means for varying the angular relationship between said rotatable mechanisms and means controlled by said motion receiving device rendering said last mentioned means effective to vary said angular relationship and thereby the length of the supply period.

20. In a heat transfer system, the combination including a source of heat transfer medium, a zone to be supplied therewith, regulating means for controlling the supply of said medium to said zone, means controlling said regulating means for periodically distributing said medium to said zone for predetermined lengths of time, said means including a rotatable control mechanism for initiating the supply, a constant speed driving means therefor, a second rotatable control mechanism for terminating the supply and means including a differential drive mechanism connecting said second mechanism to said constant speed driving means whereby said rotatable mechanisms are normally driven at said constant speed with and at a fixed angular relation to each other, and means responsive to variations in outdoor temperature varying said angular relation for varying said predetermined length of time, said means including means responsive to variations in outdoor temperature, an electric motion transmitting device actuated thereby, a differential electrical motion receiving device actuated by the latter, driving means for said differential drive mechanism adapted when rendered operable to vary the speed of said second rotatable mechanism for varying said angular relationship, and means controlled by said motion receiving device for rendering said last mentioned driving means effective.

21. In a heat transfer system, the combination including a source of heat transfer medium, a zone to be supplied therewith, regulating means for controlling the supply of said medium to said zone, means controlling said regulating means for periodically distributing said medium to said zone for predetermined lengths of time, said means including a rotatable control mechanism for initiating the supply, a constant speed driving means therefor, a second rotatable control mechanism for terminating the supply and means including a differential drive mechanism connecting said second mechanism to said constant speed driving means whereby said rotatable mechanisms are normally driven at said constant speed with and at a fixed angular relation to each other, and means responsive to variations in outdoor temperature varying said angular relation for varying said predetermined length of time, said means including means responsive to variations in outdoor temperature, an electric motion transmitting device actuated thereby, a differential electrical motion receiving device actuated by the latter, driving means for said differential drive mechanism adapted when rendered operable to vary the speed of said second rotatable mechanism for varying said angular relationship, means controlled by predetermined movement said motion receiving device from a normal position for rendering said last mentioned driving means effective to vary said relationship, and second electric motion transmitting device actuated by said last mentioned driving means, said transmitting device also actuating said differential receiving device and adapted to return the latter to its normal position upon predetermined movement of said driving means.

22. In a heating transfer system, the combination including a source of heat transfer medium, a zone to be supplied therewith, regulating means for controlling the supply of said medium to said zone, means controlling said regulating means for periodically distributing said medium to said zone for predetermined lengths of time, said means including a rotatable control mechanism for initiating the supply, a constant speed driving means therefor, a second rotatable control mechanism for terminating the supply and means including a direrential drive mechanism connecting said second mechanism to said constant speed driving means whereby said rotatable mechanisms are normally driven at said constant speed with and at a fixed angular relation to each other, and means responsive to variations in outdoor temperature varying said angular relation for varying said predetermined length of time, said means including means responsive to variations in outdoor temperature, an electric motion transmitting device actuated thereby, a differential electrical motion receiving device actuated by the latter, driving means for said differential drive mechanism adapted when rendered operable to vary the speed of said second rotatable mechanism for varying said angular relationship, means controlled by predetermined movement said motion receiving device from a normal position for rendering said last mentioned driving means effective to vary said relationship, second electric motion transmitting device actuated by said last mentioned driving means, said transmitting device also actuating said differential receiving device and adapted to return the latter to its normal position upon predetermined movement of said driving means, and means for rendering said differential motion receiving device ineffective to control said driving means in response to predetermined movement of said second mentioned motion transmitting device.

HARRY R. CRAGO.

CERTIFICATE OF CORRECTION.

Patent No. 2,157,817.   May 9, 1939.

HARRY R. CRAGO.

It is hereby certified that error appears in the printed specification of the above numbered patent requiring correction as follows: Page 2, first column, line 64, for "onductors" read conductors; same page, second column, line 16, for "ontacts" read contacts; page 7, first column, line 47, claim 11, after the word "one" insert of; page 8, second column, line 66, claim 22, for "direrential" read differential; and that the said Letters Patent should be read with this correction therein that the same may conform to the record of the case in the Patent Office.

Signed and sealed this 13th day of June, A. D. 1939.

Henry Van Arsdale
Acting Commissioner of Patents.

(Seal)